US012641162B2

(12) United States Patent
Ciepiel

(10) Patent No.: US 12,641,162 B2
(45) Date of Patent: May 26, 2026

(54) INTELLIGENT BLENDING SYSTEM

(71) Applicant: Vita-Mix Management Corporation, Olmsted Township, OH (US)

(72) Inventor: Anthony Ciepiel, Hudson, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 1310 days.

(21) Appl. No.: 17/160,827

(22) Filed: Jan. 28, 2021

(65) Prior Publication Data

US 2021/0152649 A1 May 20, 2021

Related U.S. Application Data

(62) Division of application No. 14/623,207, filed on Feb. 16, 2015, now Pat. No. 10,931,765.

(51) Int. Cl.
| | |
|---|---|
| *H04L 67/50* | (2022.01) |
| *A47J 36/32* | (2006.01) |
| *A47J 43/046* | (2006.01) |
| *A47J 43/07* | (2006.01) |
| *G06F 16/9535* | (2019.01) |
| *H04L 67/306* | (2022.01) |

(52) U.S. Cl.
CPC .......... *H04L 67/535* (2022.05); *A47J 36/321* (2018.08); *A47J 43/046* (2013.01); *A47J 43/07* (2013.01); *G06F 16/9535* (2019.01); *H04L 67/306* (2013.01); *A47J 2043/0733* (2013.01)

(58) Field of Classification Search
CPC ...... H04L 67/535; A47J 43/046; B01F 35/213
See application file for complete search history.

(56) References Cited

U.S. PATENT DOCUMENTS

| | | | |
|---|---|---|---|
| 2,955,186 A | 10/1960 | Ritter | |
| 3,299,226 A | 1/1967 | Edwards | |
| 3,548,280 A | 12/1970 | Cockroft | |
| 3,731,059 A | 5/1973 | Wilson | |
| 3,943,421 A | 3/1976 | Shibata et al. | |
| 3,951,351 A | 4/1976 | Erster et al. | |
| 4,568,193 A | 2/1986 | Contri et al. | |
| 4,686,356 A | 8/1987 | Ueda et al. | |

(Continued)

FOREIGN PATENT DOCUMENTS

| | | |
|---|---|---|
| CN | 1853547 | 11/2006 |
| CN | 101194807 | 6/2008 |

(Continued)

OTHER PUBLICATIONS

Copenheaver, Blaine, International Search Report and Written Opinion, PCT/US2014/029134, Aug. 1, 2014, International Search Authority/ USA.

(Continued)

*Primary Examiner* — Marc C Howell
(74) *Attorney, Agent, or Firm* — Dinsmore & Shohl LLP

(57) ABSTRACT

A blending system is provided for contextual blending. The blending system may include an ingredient component and a recipe component. The ingredient component may identify ingredients and determine a quantity of each type of ingredient. The recipe component may create a recipe based on the identified ingredients and the determined quantities of the ingredients. The recipe may include instructions for controlling a blender device.

14 Claims, 12 Drawing Sheets

(56) References Cited

U.S. PATENT DOCUMENTS

| | | | |
|---|---|---|---|
| 4,762,057 | A | 8/1988 | Hirota et al. |
| 4,822,172 | A | 4/1989 | Stottmann |
| 4,893,942 | A | 1/1990 | Stottmann |
| 4,968,864 | A | 11/1990 | Doi et al. |
| 5,156,867 | A | 10/1992 | Leuthold et al. |
| 5,267,211 | A | 11/1993 | Kobayashi et al. |
| 5,267,790 | A | 12/1993 | Sutherland et al. |
| 5,316,382 | A | 5/1994 | Penaranda et al. |
| 5,347,205 | A | 9/1994 | Piland |
| 5,363,746 | A | 11/1994 | Gordon |
| 5,392,695 | A | 2/1995 | Junkel |
| 5,531,153 | A | 7/1996 | Maruyama et al. |
| 5,556,198 | A | 9/1996 | Dickson, Jr. et al. |
| 5,562,020 | A | 10/1996 | Shigeshiro |
| 5,577,735 | A | 11/1996 | Reed et al. |
| 5,605,090 | A | 2/1997 | Mantani et al. |
| 5,628,240 | A * | 5/1997 | Yoshida ................. A21B 7/005 |
| | | | 99/348 |
| 5,660,467 | A | 8/1997 | Mineo et al. |
| 5,768,978 | A | 6/1998 | Dorner et al. |
| 5,829,341 | A | 11/1998 | Lin |
| 5,839,356 | A | 11/1998 | Dornbush et al. |
| 5,967,021 | A | 10/1999 | Yung |
| 6,210,033 | B1 | 4/2001 | Karkos, Jr. et al. |
| 6,364,522 | B2 | 4/2002 | Kolar et al. |
| 6,402,365 | B1 | 6/2002 | Wong |
| 6,609,821 | B2 | 8/2003 | Wulf et al. |
| 6,959,562 | B2 | 11/2005 | Navedo et al. |
| 7,422,362 | B2 | 9/2008 | Sands |
| 9,155,330 | B1 * | 10/2015 | Shtivelman ........... A47J 43/046 |
| 2002/0009016 | A1 | 1/2002 | Ancona et al. |
| 2002/0009017 | A1 | 1/2002 | Kolar et al. |
| 2002/0176320 | A1 | 11/2002 | Wulf et al. |
| 2003/0185094 | A1 | 10/2003 | Packard |
| 2004/0203387 | A1 | 10/2004 | Grannan |
| 2005/0068846 | A1 | 3/2005 | Wulf |
| 2005/0229795 | A1 | 10/2005 | Stuckey |
| 2006/0086843 | A1 | 4/2006 | Lin et al. |
| 2006/0169715 | A1 | 8/2006 | Emmendorfer et al. |
| 2006/0203610 | A1 | 9/2006 | Bohannon, Jr. et al. |
| 2006/0214765 | A1 | 9/2006 | Pitchers et al. |
| 2007/0221668 | A1 | 9/2007 | Baarman et al. |
| 2009/0259688 | A1 * | 10/2009 | Do .......................... G06F 3/016 |
| | | | 707/E17.096 |
| 2011/0046786 | A1 | 2/2011 | Wulf |
| 2011/0096619 | A1 | 4/2011 | Pryor et al. |
| 2011/0149677 | A1 | 6/2011 | Davis et al. |
| 2011/0189358 | A1 | 8/2011 | Herbert |
| 2011/0199220 | A1 * | 8/2011 | McAlister .............. B01J 19/245 |
| | | | 138/155 |
| 2011/0199852 | A1 | 8/2011 | Martin |
| 2011/0248108 | A1 | 10/2011 | Carriere |
| 2012/0269936 | A1 | 10/2012 | Claesson |
| 2013/0033957 | A1 * | 2/2013 | Huang .............. B01F 35/22142 |
| | | | 366/206 |
| 2013/0185646 | A1 * | 7/2013 | Wiggins .................. H04L 67/62 |
| | | | 715/739 |
| 2013/0334349 | A1 * | 12/2013 | Carden .................. A47J 43/046 |
| | | | 241/101.2 |
| 2014/0095479 | A1 | 4/2014 | Chang |
| 2014/0269154 | A1 | 9/2014 | Kolar |
| 2015/0305567 | A1 * | 10/2015 | Koetz ................. B01F 35/2206 |
| | | | 366/342 |

FOREIGN PATENT DOCUMENTS

| | | | |
|---|---|---|---|
| WO | 2005092158 | 10/2005 | |
| WO | WO-2005092158 A2 * | 10/2005 | .............. A23L 2/02 |
| WO | 2006104651 | 10/2006 | |
| WO | 2006124051 | 11/2006 | |
| WO | 2015138961 | 9/2015 | |

OTHER PUBLICATIONS

Young, Lee W., International Search Report and Written Opinion, PCT/US2014/029384, Aug. 11, 2014, International Search Authority/USA.

Gaggia Espanola, S.A., ipanerma, brochure, undated.

Gaggia Espanola, S.A., Copacabana, brochure, undated.

Gaggia Espanola, S.A., ipanema Space-Saving High Technology, brochure, undated.

International Search Report and the Written Opinion of the International Searching Authority, PCT/US2016/018053, Vita-Mix Management Corporation, Jul. 26, 2016.

Supplementary European Search Report for Application No. 16752897.5 relating to PCT/US2016018053, dated Nov. 14, 2018.

English Translation of Chinese Office Action dated Aug. 2, 2019; 17 pages.

* cited by examiner

100

OUTPUT
112

INPUT
114

MEASURING COMPONENT
120

INGREDIENT COMPONENT
110

RECIPE COMPONENT
140

ACCOUNT COMPONENT
130

CONTEXTUAL BLENDING SYSTEM
106

MEMORY
102

PROCESSOR
104

200

OUTPUT
212

| MEASURING COMPONENT 220 | INGREDIENT COMPONENT 210 | DIETARY COMPONENT 250 |

INPUT
214

| RECIPE COMPONENT 240 | ACCOUNT COMPONENT 230 |

CONTEXTUAL BLENDING SYSTEM
206

MEMORY
202

PROCESSOR
204

OUTPUT
312

| MEASURING COMPONENT 320 | INGREDIENT COMPONENT 310 | RATING COMPONENT 350 |
|---|---|---|

INPUT
314

| RECIPE COMPONENT 340 | ACCOUNT COMPONENT 330 |
|---|---|

CONTEXTUAL BLENDING SYSTEM
306

MEMORY
302

PROCESSOR
304

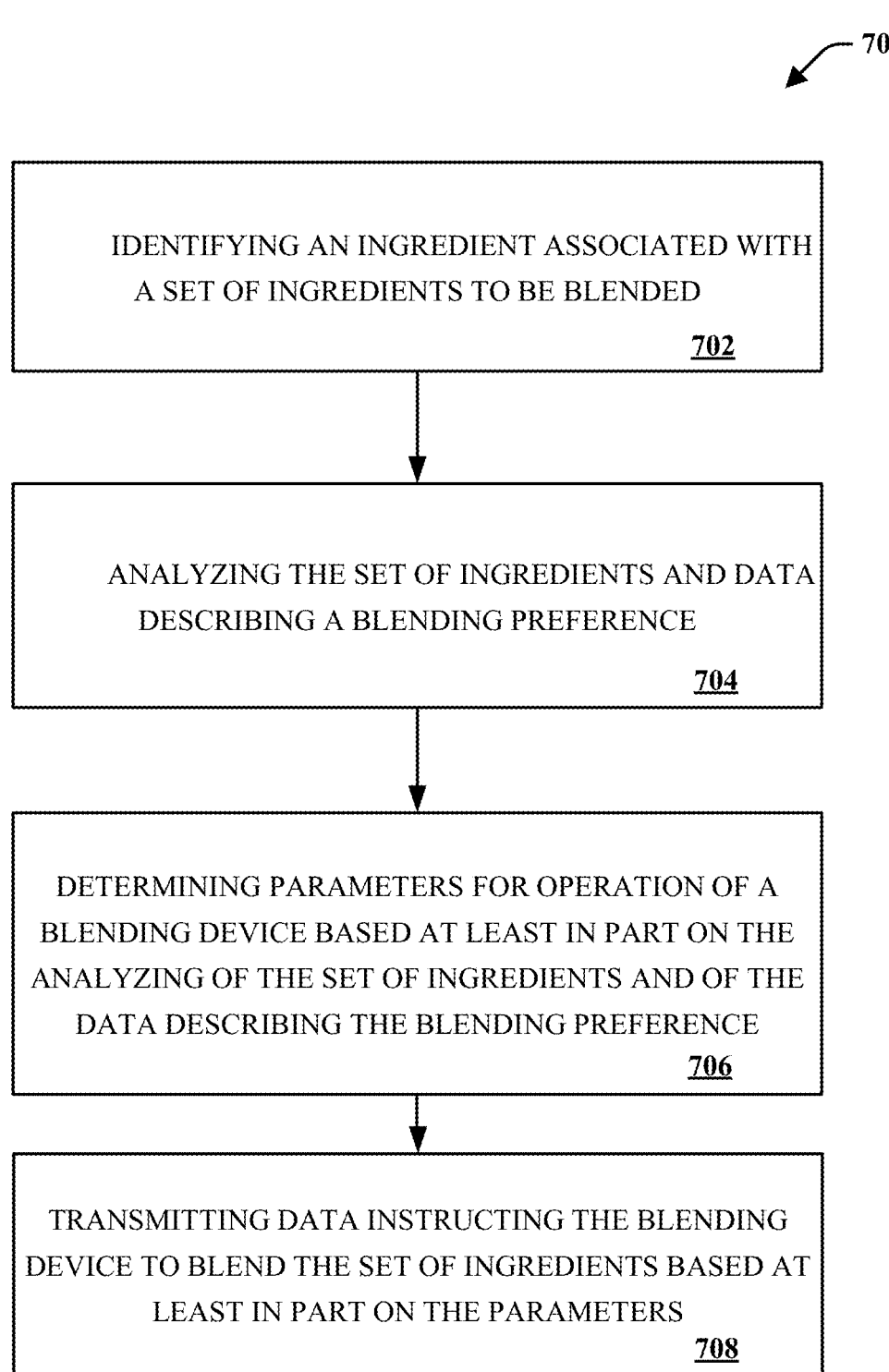

700

IDENTIFYING AN INGREDIENT ASSOCIATED WITH A SET OF INGREDIENTS TO BE BLENDED

702

ANALYZING THE SET OF INGREDIENTS AND DATA DESCRIBING A BLENDING PREFERENCE

704

DETERMINING PARAMETERS FOR OPERATION OF A BLENDING DEVICE BASED AT LEAST IN PART ON THE ANALYZING OF THE SET OF INGREDIENTS AND OF THE DATA DESCRIBING THE BLENDING PREFERENCE

706

TRANSMITTING DATA INSTRUCTING THE BLENDING DEVICE TO BLEND THE SET OF INGREDIENTS BASED AT LEAST IN PART ON THE PARAMETERS

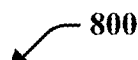

800

MONITORING A HISTORY ASSOCIATED WITH A USER ENTITY, WHEREIN THE HISTORY COMPRISES DATA DESCRIBE AT LEAST ONE OF A BLENDING HISTORY, A DIETARY HISTORY, OR A FITNESS ACTIVITY HISTORY

802

DETERMINING DATA DESCRIBING A USER PREFERENCE

804

GENERATING A SUGGESTION FOR ALTERING A SET OF INGREDIENTS BASED ON AT LEAST ONE OF THE DATA DESCRIBING A BLENDING PREFERENCE, THE HISTORY, OR A USER DEFINED THRESHOLD ASSOCIATED WITH A BLENDED PRODUCT    806

GENERATING A NOTIFICATION THAT CONVEYS THE SUGGESTION

RECEIVING DATA ASSOCIATED WITH FOODSTUFF

<u>902</u>

IDENTIFYING THE FOODSTUFF BASED ON THE DATA
ASSOCIATED WITH THE FOODSTUFF

<u>904</u>

DETERMINING A QUANTITY OF THE FOODSTUFF BASED
ON AN OUTPUT OF A MEASUREMENT SYSTEM

<u>906</u>

DETERMINING AT LEAST ONE OF A COOKED STATUS, A
TEMPERATURE STATE, OR A PREPARATION STATUS OF
THE FOODSTUFF

<u>908</u>

1000

MONITOR INGREDIENTS ADDED TO A BLENDING DEVICE

<u>1002</u>

MONITOR AN ORDER OF ADDITION OF THE INGREDIENTS

<u>1004</u>

DETERMINE DIETARY GOALS

<u>1006</u>

GENERATE CONTEXTUAL BLENDING PROCESS BASED AT LEAST IN PART ON THE INGREDIENTS, THE ORDER OF ADDITION, OR THE DIETARY GOALS

<u>1008</u>

INTELLIGENT BLENDING SYSTEM

RELATED APPLICATIONS

This application is a divisional of U.S. Utility application Ser. No. 14/623,207 filed on Feb. 16, 2015, and entitled, "INTELLIGENT BLENDING SYSTEM" the entirety of which is incorporated herein by reference.

TECHNICAL FIELD

The present invention relates to a blending system and, more particularly, to an intelligent blending system that generates an intelligent and contextual blending process for blending of foodstuff.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with commercial or restaurant-grade blender. Such drinks also may be made at home, using a personal blender.

One disadvantage with making any such drinks (examples of which are identified above), or utilizing blenders, is the difficulty in blending to a user's specific tastes or preferences due to the specific ingredients required in some recipes. Another disadvantage with making such drinks is the difficulty in measuring ingredients.

Users tend to add ingredients without measuring properly or by estimating amounts. Further, users may alter recipes to avoid or include certain ingredients. These alterations may change a resulting consistency or texture of a final blended drink. Users may not know how to change a blending process to meet their preferences. Further, users may not be able to determine dietary and fitness needs based on altered recipes.

Therefore, a need exists for improved systems and methods for blending contents in a blender. Further, there is a need for monitoring alterations in recipes and customizing blending systems for user preferences.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A blending system having various innovative features is provided herein. The blending system may include an ingredient component that may identify an ingredient and may determine a quantity of the ingredient that is added to a blending container. The quantity of the ingredient may be measured by a measuring system and communicated to the ingredient component. A recipe component may generate suggestions for altering contents in a container to arrive at a user desired end state. Further, the recipe component may determine a blending process for blending the contents in the container.

A method for contextual blending is also provided. The method may provide for blending foodstuff based on contents of the foodstuff. The method may include determining a type of ingredient and determining a quantity of the ingredient. The method may further include generating a contextual and/or intelligent blending process for blending the ingredients according to a user's preference on the contents of the foodstuff.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout, and in which:

FIG. 7 is a flow diagram of an exemplary method associated with a blender system in accordance with various embodiments described here;

FIG. 8 is a flow diagram of an exemplary method associated with a blender system that may generate a notification in accordance with various embodiments described here;

DETAILED DESCRIPTION

Figure 1:
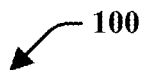
FIG. 1 is a functional block diagram of a blending system in accordance with various embodiments described here.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Moreover, terms such as "access point," "server," and the likes, are utilized interchangeably, and refer to a network component or appliance that serves and receives control data, voice, video, sound, or other data-stream or signaling-stream. Data and signaling streams may be packetized or frame-based flows. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). Still further, "user," "customer," "consumer," may include a commercial establishment(s), such as a restaurant, restaurant chain, commercial kitchen, grocery store, convenience store, ice-cream shop, smoothie restaurant, or the likes.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

A network typically includes a plurality of elements that host logic. In packet-based wide-area networks (WAN), servers (e.g., devices comprising logic) may be placed at different points on the network. Servers may communicate with other devices and/or databases. In another aspect, a server may provide access to a user account. The "user account" includes attributes for a particular user and commonly include a unique identifier (ID) associated with the user. The ID may be associated with a particular mobile device and/or blender device owned by the user. The user account may also include information such as relationships with other users, application usage, location, personal settings, and other information.

Embodiments may utilize substantially any wired or wireless network. For instance, embodiments may utilize various radio access network (RAN), e.g., Wi-Fi, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, $x^{th}$ generation long term evolution, or another IEEE 802.XX technology. Furthermore, embodiments may utilize wired communications.

It is noted that, terms "user equipment," "device," "user equipment device," "client," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), desktop computers, etc.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulations networks, and the likes. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blending systems, various other food preparation systems, and the likes. As such, references to a blender, blender system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blender container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the likes. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the likes are used interchangeably unless context suggest otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Moreover, blending of foodstuff or ingredients may result in a blended product. Such blended products may include drinks, frozen drinks, smoothies, shakes, soups, purees, sorbets, butter (nut), dips or the likes. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

Aspects of systems, apparatuses or processes described herein generally relate to blending or mixing systems. In an embodiment, an ingredient component may monitor ingredients added to a blending container. The ingredient component may determine a quantity (e.g., volume, weight, etc.) and state(s)/status(es) (e.g., cooked, raw, frozen, etc.) of each ingredient. A recipe component may access a stored recipe or dynamically create a recipe based on a blending preference, such as a user's blending preference or a predefined preference. The recipe component may compare added ingredients, quantities, and states of ingredients with a stored recipe or user preferences to determine a blending process (e.g., blade speed, blending pattern, timing, etc.). Further, the recipe component may suggest adding certain ingredients, adding more or specific types of liquids, more or specific types of solids, or other items (chia seeds) to achieve a predefined or preferred blending result.

Another aspect of the disclosed subject matter relates to determining dietary or fitness goals based on a history of utilized recipes and defined rules. A user may set preferences for fitness or dietary goals (e.g., calories, etc.). The fitness/dietary goals may include limits or thresholds on intake of certain substances or properties of substances (e.g., sugars, fats, calories, sodium, etc.). A recipe may be generated and/or suggestions for altering a recipe may be generated based on the fitness/dietary goals. For instance, actual recipes that a user has utilized may be stored and systems or methods described herein may suggest substitution of ingredients based on the fitness/dietary goals and/or other user preferences.

In an example, an intelligent blending system may include a blender device, a user device, and a scale or measurement device that may be external to or part of the blender device or the user device. The user may interact with the various devices by providing input. In an aspect, the user may enter blending preferences into a user device. The preference may include a level of thickness, texture, a desired temperature, calorie or other dietary levels, and the likes of the end product. As the user selects ingredients to add to the blending device, the user may input the type of ingredient and/or status of the ingredient to the user device. Further, the scale may measure a quantity of each ingredient and communicate the quantity to the user device. Based on the input, the user device may determine a blending process to achieve a user's goal or preference. The user device may communicate the blending process to the blending device and the blending device may implement the blending process. It is noted that blending preferences may also be based on predefined preferences, dynamically determined preferences and/or preferences received from other users.

Referring now to FIG. 1, there depicted is a block diagram of a functional blending system 100 that may generate and/or implement intelligent/contextual blending processes based on actual ingredients. Blending system 100 may primarily include contextual blending system 106, memory 102, and processor 104. Memory 102 may be configured for storing computer executable components such as an ingredient component 110, a measuring component 120, account component 130, and a recipe component 140. Processor 104 may facilitate operation of the computer executable components. It is noted that system 100 may include one or more devices, such as a user device, a blender device, and a scale. It is further noted that one or more devices may comprise, at least in part, the various components. For instance, a single component of system 100 may be comprised by one or more devices. While shown as separate or distinct components, the components of system 100 may be comprised by one or more components. Further, the system 100 may include a plurality of blending devices that may be linked together through a network and transrecievers. These blending devices may be operatively linked with a server that may operate or otherwise update the plurality of blending devices.

Ingredient component 110 may monitor ingredients added to a blender device (or a plurality of blending devices). In an aspect, ingredient component 110 may receive input 114 comprising data that describes an ingredient. The data may be user input in the form of text, voice input, selection of a prompt (e.g., user selecting a check box, etc.), or the likes. For example, the user may type "spinach" via an input device (e.g., touch screen, keyboard, etc.) of system 100. In another example, the user may speak a term or phrase into a microphone and ingredient component 110 may utilize a speech recognition process to determine the identity or other aspects of the ingredient. Further examples allow a user to scroll through a list of ingredients and select a representation of spinach (e.g., textual, graphical, etc.).

In another aspect, ingredient component 110 may include or may communicate with other systems, such as cameras, optical scanning devices, optical scanners, spectrometer, multi-wave length scanner, electronic noses, or the likes. Based on input from the other systems, ingredient component 110 may determine an identity of an ingredient. Ingredient component 110 may utilize image recognition techniques to identify an image received as input 114. For example, a user may utilize user equipment devices, such as a smart phone or other camera device to capture an image of one or more ingredients. Ingredient component 110 may receive the image and identify one or more ingredients in the image. In another aspect, identified ingredients may be added to a list of ingredients for a current blending process. It is noted that ingredient component 110 may utilize other methods or processes of identifying an ingredient, such as scanning a barcode, label, radio frequency identification (RFID) tag, or other identifier on a product or product packaging. This may be particularly useful in a commercial blending system whereby prepackaged foodstuff ingredients are used and stored for use with the blending system. The prepackaged foodstuff may include at least one of the aforementioned devices to communicate with the system 100 to identify the contents of the prepackaged foodstuff.

In another example, ingredient component 110 may include or communicate with an electronic nose that may analyze a headspace (e.g., portion) of a sample (e.g., airborne sample). For instance, an electronic nose may gather a sample and ingredient component 110 may detect a presence and an amount of a chemical in the headspace. In one implementation, the electronic nose may include a sensory array or film. The sensory array may react to various chemicals within the headspace. The reaction may cause a change in physical or electrical properties of the sensory array. In one example, absorption of the chemicals in the headspace causes physical alterations of the various sensors in the sensory array. Each sensor or a sensory array may react differently to the various chemicals. Ingredient component 110 may transform the reactions of the sensory array into a digital signal. The digital signal may be computed based on a statistical model. For example, an organic ultra-thin transistor chemical sensor having a channel that consists of one or more monolayers may be employed. The organic ultra-thin film transistor chemical sensor may have monolayer thin film channels that act as highly sensitive detectors of trace levels of organic vapors and may perform quantitative vapor analysis. The organic ultra-thin film may be permeable to a chemical analyte of interest. Based on the analyzed headspace ingredient component 110 may identify the type of ingredient.

In at least one embodiment, ingredient component 110 may determine a quantity associated with an ingredient. The quantity may be based on received input 114. Input 114 may be user input, such as a user entered volume, mass, or the likes. Further, the quantity may be derived from an image. For instance, ingredient component 110 may recognize a gradient mark on a measuring device (e.g., measuring cup, etc.) or a quantity indicator on a packaging.

In another aspect, the quantity may be based on a measurement of the ingredient from measuring component 120. Measuring component 120 may include a scale, sensor, or other device capable of determining a quantity. For instance, measuring component 120 may include a scale that measures a weight or mass. It is noted that the scale may be comprised within a blending device or may be a standalone device. In various embodiments, measuring component 120 may determine a weight of an ingredient and may communicate, via a wireless or wired connection, the weight to ingredient component 110. In some instances, measuring component 120 may not have wireless or wired communication capabilities. In such instances, a user may read a measurement from a display of measuring component 120 and may supply the measurement as input 114 to system 100, such as through an interface (e.g., touch screen, etc.).

In embodiments, a user may override measurement data from measuring component 120. For instance, a user may review a weight of an ingredient and may alter the weight.

In embodiments, ingredient component 110 may receive or determine status information associated with ingredients. Status information may include information about a state of an ingredient. Such states may include, for example, raw, cooked (e.g., level of doneness, type of cooking, etc.), frozen, thawed, temperature, fresh, canned, sliced, chopped, skinned, whole, and the likes. In some instances, certain ingredients may have specialized or specific statuses not available to other ingredients. For instance, some fruits or vegetables may be associated with statuses such as peeled, not-peeled, cored, not-cored, trimmed of leaves, etc. Other ingredients, such as liquid ingredients (e.g., water, milk, etc.) may not be associated with such statuses.

It is noted that an ingredient may be associated with multiple statuses; however, some statuses may be exclusive of other statuses. That is, an ingredient may not be both raw and cooked. As described above, ingredient component 110 may receive input 114 from a user, an image capturing device, an electronic nose, or another device. Ingredient component 110 may utilize such input 114 to determine or drive a status. For example, ingredient component 110 may utilize image recognition to determine that an ingredient is from a can, a frozen package, a prepackaged container, or the likes.

Furthermore, ingredient component 110 may utilize or comprise other systems. For instance, ingredient component 110 may include or communicate with a thermometer. The thermometer may be comprised within a larger device, such as a scale, container, blender device, or a stand-alone device. In some embodiments, the thermometer may be comprised within a user device (e.g., such as a laser thermometer, etc.). Further, in some embodiments, the thermometer may be included in the container itself. Ingredient component 110 may utilize a temperature to determine whether an ingredient is at least partially frozen, cooked, and/or thawed. The thermometer may be of any configuration, including an infrared thermometer. Further, in an aspect hereof, the thermometer may include a near field communication device that is able to read the temperature of the contents within the container and communicate such to a processor (such as one in the blending device) or to a user device.

It is noted that system 100 may utilize various other statuses and may include or communicated with various other devices or systems not described for sake of brevity. Such statuses and systems are considered variations within the scope and spirit of the described subject matter.

Ingredient component 110 may also determine or monitor an order of addition of ingredients. In an aspect, ingredient component 110 may record a time associated with an ingredient being added to a container of a blender device. In some embodiments, the ingredient component 110 may determine a time based on information received from measuring component 120. For instance, a user may enter ingredients and associated quantities into ingredient component 110. At a later time, the user may begin to add the ingredients to a container. As the weight of the container changes, ingredient component 110 may determine the order of addition of the ingredients based on data from measuring component 120.

In an aspect, ingredient component 110 may analyze what has been added and identify for the user that the identified end product is not obtainable based upon the recipe being used. Further, the ingredient component 110 may notify the user or may modify (or send notification to so modify) the recipe or processing parameters based upon the ingredients added. For example, the ingredient component 110 may analyze (such as through any manner, including, without limitation those described above) the added ingredients. The ingredient component 110 may identify that too much of a particular ingredient was added that would result in a consistency that is not preferred. The ingredient component 110 may modify directly or send notification to modify the blending time to account for the over-added or under-added ingredient.

Account component 130 may determine user preferences based on received data, historical data, and the likes. In at least one embodiment, user preferences may be stored in a user account (e.g., via memory 102). A user may manually alter preferences and/or account component 130 may automatically alter preferences based on inferences. Furthermore, account component 130 may manage dietary and/or fitness goals or achievements as described in more detail herein.

In an aspect, a user may provide explicit information related to user preferences. For instance, a user may provide, and account component 130 may receive, information associated with preferences related to various aspects of blending contents. For example, a user may provide information (e.g., input 114) related to preferred consistency or texture (e.g., thickness, thinness, etc.), time of blending (e.g., fastest blend, etc.), temperature, calories or other dietary information, and the likes. The user may specify preferences for specific types of blending recipes, such as for smoothies, frozen drinks, milk shakes, health smoothies, raw smoothies, etc. This may further include a plurality of blending devices that may be networked together. In these aspects, the input 114 may be a central user equipment device connected through a network and/or server that may be used to modify a recipe that is used by the plurality of blending devices to achieve a desired blend. The account components 130 of the blending devices may store the revised recipes in their memories. This may provide a mechanism by which a retail chain, restaurant (especially a multi-location one), or the likes may modify a predefined recipe for the entire plurality of blending devices that may be located at different locations through a single input 114, which may be located at a central or regional office or location.

In another aspect, account component 130 may determine or monitor a user's preferences based on a history associated with the user. The history may be related to a history of made items, rankings associated with items, or the likes—such as through a restaurant chain or the likes. Such will be described in more detail herein. In embodiments, account component 130 may also include additional information such as a device ID, user ID, devices associated with a user (e.g., blender devices, scales, fitness equipment, etc.), social connections (e.g., friends, acquaintances, personal trainers, etc.), medical conditions (e.g., allergies, sensitives, etc.), and the likes.

Recipe component 140 may store (e.g., via memory 102) recipes for various drinks, smoothies, shakes, or the likes. Such recipes may be predetermined (e.g., from database of recipes), received from a different device (e.g., shared by other user devices), or the likes. In some embodiments, the recipe component 140 may receive or have inputted directly therein, a recipe that may be prescribed by a doctor, trainer, dietician, a regional or central office, or any other third party. For example, the doctor may prescribe the recipe or a plurality of recipes for a particular patient and may send directly to the blending device through the account component 130 for a user. This may be accomplished through a software program or app that the doctor may access through his or her user equipment device, through the patient's user equipment device, or any other kind of electronic storage device that the user may operatively couple with his or her user equipment device. The recipe may be fixed in that that patient cannot modify it or it may allow the patient to modify based upon his or her preferences as described herein—such as for preferred consistency, texture or the like. Similarly, a central office of a restaurant chain may modify a current or a plurality of current recipes or add or delete a recipe or a plurality of recipes for use by the entire restaurant chain or a set of predefined locations. The modified, added or deleted recipes may be sent directly to each of the blending devices through the account component 130, such as through a server and network. This may be accomplished through a software program or app that the central office may access through its user equipment device, through the particular restaurant's user equipment device that may include transreceivers, or any other kind of electronic storage device that the may be operatively coupled with the blending device, including without limitation through a memory device provided to each such location. The recipe may be fixed in that the particular restaurant location cannot modify it or it may allow the restaurant location to modify based upon regional preferences.

A recipe may include information associated with ingredients (identity, quantity, status, etc.) and a blending process (e.g., power settings, blade speed, blending pattern, etc.). In an aspect, recipe component 140 may alter a recipe based on a user preference and/or device data received from account component 130. For example, a user may desire a determined level of thickness and may be associated with a particular make and model of a blender device. Based on the user's preference and the blender device, recipe component 140 may customize the recipe for the user (e.g., alter a quantity of an ingredient, add/remove an ingredient, etc.). The customized recipe may be stored, for example, in memory 102. For example, if a restaurant chain upgrades certain of its blending devices, the recipes may need to be modified for those locations with the upgraded blending devices. The recipe components 140 of the upgraded blending devices may alter the previous recipes to account for the functionality of the upgraded blending devices.

In various aspects, a user may not follow a predetermined or preset recipe. Rather, the user may freelance with different ingredients, quantities, statuses of ingredients, and the likes. For instance, a user may realize that they do not have a particular ingredient in their refrigerator or cupboard or that may otherwise be available in the restaurant. Thus, the user decides to add other ingredients that they have on hand. In this instance, recipe component 140 may generate a custom recipe based on the user's preferences and the added ingredients. For instance, ingredient component 110 may determine added ingredients and recipe component 140 may determine a blend of such ingredients that results in an attribute to which the user has a low affinity, such as a thick final product or drink or a drink (or other end product) that would not blend or otherwise would not result in the appropriate blend. Recipe component 140 may suggest addition of an ingredient and/or altering amounts of an ingredient. Suggestions may also include suggestions for altering preparation of ingredients, such as chop, slice, cook, thaw, and the likes. Further still, recipe component 140 may allow a user to select or otherwise modify an existing recipe based upon the ingredients the user may possess. The user may identify, such as in any appropriate manner, the ingredients on hand. The recipe component 140 may, based upon these ingredients, provide a recommendation for a recipe or may alter another recipe based upon the ingredients on hand. Further, the recipe component 140 may recommend to a user or may automatically alter a state of the resultant blend or may suggest or instruct a user to add ingredients to solve a problem related to the blend, e.g., instruct the user to add chia seeds because the resultant blend contains too much foam. In such embodiments, the user may communicate with the blending system 100 to identify the issues or problems with the resultant blend in any appropriate manner, such as through a user equipment device, including a computer, laptop, tablet, smart phone, the blending system 100 directly or any other appropriate manner.

Furthermore, recipe component 140 may generate a blending process comprising instructions for a blender device (e.g., power settings, blade speeds, blending patterns, timing information, etc.). In embodiments, recipe component 140 may determine the blending process based on determining attributes associated with content to be blended (e.g., quantities, statuses, characteristics, ratios, etc.). For instance, recipe component 140 may include processes that determine a blending process based on determining a consistency/texture (e.g., thickness, thinness, etc.) associated with ingredients, a ratio of liquids to solids, a time associated with blending, a power usage associated with blending, a temperature change associated with blending, and the likes. It is noted that recipe component 140 may be configured to alter (e.g., optimize) attributes based on a users preference. For example, recipe component 140 may suggest additional ingredients to alter a consistency, texture or temperature associated with a blended product or ingredients to be blended. In some embodiments, recipe component 140 may store and/or determine characteristics associated with ingredients, such as consistency of a blend of the ingredient, a type of the ingredient (e.g., solid, liquid, thickening agent, etc.), and the likes. Recipe component 140 may compare characteristics of various added ingredients to determine resulting characteristics of a blended product based on a blending process.

Such processes may take the context of what is being blended in regards to the ingredients, statuses of ingredients, quantities of ingredients, and personal preferences or recommended consistencies or event temperature and may create a custom blending process or program based on those ingredients, statuses, quantities, order of addition of ingredients, and preferences to meet target thresholds. It is noted that various aspects may alter attributes of a finished product. For example, use of a fresh (not caned or frozen) raw carrot may result in a different consistency than use of a fresh (not caned or frozen) cooked carrot. Further, a raw and canned carrot may result in a different consistency than a raw and non-canned carrot. Moreover, a thawed (e.g., previously frozen) carrot may result in a different consistency than a raw (e.g., never frozen) carrot.

Moreover, recipe component 140 may generate or select one or more sets of instructions for a recipe, such as a blending process. One or more blending processes may be stored, such as in memory 102. For example, memory 102 may store a set of preconfigured blending processes. The blending processes may comprise a series or sequence of blender settings and operations to be carried out by the blending device. For example, a blending process may comprise a series of blender motor speeds to operate the blender blade at the given speed, a series time intervals corresponding to the given motor speeds, and other blender parameters and timing settings. The blending processes may further include a ramp or ramp up period that defines the amount of time it takes or the rate at which the motor gets up to the predetermined motor speed.

It is noted that a blending process may also comprise instructions that generate notifications for actions to be executed by a user, such as addition of an ingredient or increasing of a motor speed (e.g., if the blender device cannot increase the speed automatically). For example, at a given period or time, the blending process may instruct a blender device to stop a motor. The blending process may then instruct an interface (e.g., a screen of a smart phone or tablet) to display a prompt that requests a user to add an ingredient (e.g., "please add 1 cup of ice").

In at least one embodiment, recipe component 140 may select a preset blending processes and/or create a custom blending process based on the context of what is being blended in regards to the ingredients, statuses or ingredients, quantity of ingredients, personal preferences, recommended consistencies or recommended temperatures. For instance, a preset blending process may be selected to achieve a desired consistency or texture based on the context of what is being blended. By way of a non-limiting example, if one is making a relatively course dip, the user may want the consistency or texture of the end product to be thicker as opposed to thinner or potentially more or less coarse. This may be particularly useful in producing a dip like salsa. In another instance, recipe component 140 may create a customized blending process for optimal user satisfaction based on the context of what is being blended.

In another embodiment, recipe component 140 may generate a set of blending processes to be selected by a user. For instance, recipe component 140 may generate blending processes that focus on speed, consistency, temperature, a balance of one or more other aspects, or the likes. The user may select a desired blending process based on the user's preferences.

In an aspect, recipe component 140 may produce an end product that it is at or otherwise between a preferred temperature range. For example, a user may wish to produce a soup at a predetermined temperature, e.g., 150 degrees Fahrenheit. The recipe component 140 may control the blending process so that the resultant end product is at a predetermined temperature or between a range of temperatures, e.g., 110 degrees Fahrenheit to 190 degrees Fahrenheit. In some embodiments, a thermometer may be operatively coupled with the recipe component 140 or otherwise to the blending device such that once a preferred or predefined temperature is reached, the recipe component 140 will instruct completion of the blending process. In an aspect, the container may include a thermometer formed therein. The thermometer may include an NFC chip e.g., one that uses electromagnetic induction between two loop antennas located within the container's near field and the recipe component 140 (or more specifically the blending device), effectively forming an air-core transformer. The NFC chip may identify the temperature of the contents within the container and may provide enough power to operate the thermometer therein. Once the contents reach a predetermined temperature, the recipe component 140 (or other applicable component as described herein) may instruct the blending device to cease blending—see below for more details. This will generally prevent over-blending of the contents and provides a mechanism to automatically finish the blending process based upon the predetermined temperature. Further, the NFC chip may power the container. This may permit a digital read out or other type of display to be included on the container to indicate the temperature of the contents of the container. While a thermometer is mentioned above, the present teachings are not limited to such. The container may include any kind of sensor that may sense or detect any aspect of the ingredients add, the blending process (including time, speed of material within the container, viscosity of the material, opaqueness of the material, etc.). The sensor may be integrated into or otherwise attached with the container.

In an aspect, recipe component 140 may generate output 112 as instructions to implement the recipe or blending process. A blending device may be capable of receiving and executing instructions of the blending process. It is noted that communicating the recipe, or other information, may comprise any wired or wireless connection, including, without limitation, Wi-Fi communication, cellular communication, wired communications, or the likes. For instance, system 100 may utilize near field communication. In near field communication data may be exchanged (e.g., recipes) between devices when they are brought into a predefined close proximity of each other, including, without limitation the container and the process of the blending device.

In an aspect, recipe component 140 (as well as other components of system 100) may utilize artificial intelligence, statistical models, or other processes and/or algorithms. In embodiments, recipe component 140 may utilize classifiers that map an attribute vector to a confidence that the attribute belongs to a class. For instance, recipe component 140 may input attribute vector, $x=(x1, x2, x3, x4, xn)$ mapped to $f(x)=confidence(class)$. Such classification can employ a probabilistic and/or statistical based analysis (e.g., factoring into the analysis affinities and ingredient attributes) to infer an action that a user desires to be automatically performed. In various embodiments, recipe component 140 may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority.

In an aspect, account component 130 may utilize artificial intelligence, statistical models, or other processes and/or algorithms. In embodiments, account component 130 may utilize classifiers that map an attribute vector to a confidence that the attribute belongs to a class. For instance, account component 130 may input attribute vector, $x=(x\ 1, x2, x3, x4, xn)$ mapped to $f(x)=confidence(class)$. Such classification can employ a probabilistic and/or statistical based analysis (e.g., factoring into the analysis affinities and ingredient attributes) to infer an action that a user desires to be automatically performed. In various embodiments, account component 130 may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority. Further still, classification may also include data derived from another system, such as cameras, optical scanning devices, optical scanners, spectrometer, multi-wave length scanner, electronic noses, or the likes.

In accordance with various aspects of the subject specification, an example embodiment may employ classifiers that are explicitly trained (e.g., via a generic training data) as well as implicitly trained (e.g., via observing user behavior, blending information, user preferences, historical information, receiving extrinsic information). For example, support vector machines may be configured via learning or training phase within a classifier constructor and feature selection module. Thus, the classifier(s) may be used to automatically learn and perform a number of functions, including but not limited to determining, according to added ingredients (e.g., states and/or quantities), additional ingredients to add to meet user preferences, blending processes associated with functions of a blender motor, suggested recipes, target goals for dietary or fitness needs, and the likes. This learning may be on an individual basis, i.e., based solely on a single user, or may apply across a set of or the entirety of the user base. Information from the users may be aggregated and the classifier(s) may be used to automatically learn and perform a number of functions based on this aggregated information. The information may be dynamically distributed, such as through an automatic update, a notification, or any other method or means, to the entire user base, a subset thereof or to an individual user.

In an aspect, contextual blending system 106 may generate output 112 in the form of data. The data may include instructions that control a blender device, information associated with user preferences, requests for information, and the likes. Furthermore, output 112 may comprise instructions to control a user interface, such as a touch screen of a mobile device. The output 112 may control other user interfaces such as audible devices (e.g., speakers, microphones, etc.), visual devices (e.g., light emitting diodes (LED), etc.), or other user interfaces. This data may be aggregated to create and provide to users popular recipes. The data may be based upon how users modify existing recipes. By way of a non-limiting example, if a majority of users modify a particular recipe the data related to such modification may be aggregated such that the recipe may be automatically modified and the modified recipe provided to other users whether dynamically or otherwise. By way of a further non-limiting example, if a plurality of restaurants in a chain modifies a particular recipe in a majority of blends, the modified blend may be aggregated and the recipe automatically updated for the entire chain or a preset number of such restaurants of the chain.

While various embodiments or examples may refer to a home or personal blender device, it is noted that commercial blender devices may be utilized. Furthermore, embodiments described herein may be utilized on retail settings. For instance, users may order a blended product at a restaurant or retail store. The user may provide identification, such as via a user device. System 100 may enable customizing of the users drink based on stored preferences associated with the user ID.

Figure 2:
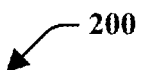
FIG. 2 is a functional block diagram of a blending system including a dietary component in accordance with various embodiments described here.

Turning now to FIG. 2, there depicted is a block diagram of a functional blending system 200 that may generate intelligent blending processes based on actual ingredients and coordinate dietary goals. Blending system 200 may primarily include contextual blending system 206, memory 202, and processor 204. Memory 202 may be configured for storing computer executable components such as an ingredient component 210, a measuring component 220, account component 230, a recipe component 240, and a dietary component 250. Processor 204 may facilitate operation of the computer executable components.

As noted, system 200 may include one or more devices, such as a user device, a blender device, and a scale. It is further noted that like named components of various systems described herein may comprise similar or identical aspects and/or functionality unless context suggests otherwise or warrants a particular distinction among such components.

For instance, ingredient component 110 and ingredient component 210 may comprise substantially similar aspects or functionality. Moreover, system 200 may include a different number of components and may be combined with any other features described herein.

Dietary component 250 may monitor blending activity, dietary information, and final blended products associated with a user. For instance, dietary component 250 may monitor a history of what ingredients were blended, how often a user blends contents, and the likes. Furthermore, dietary component 250 may include and/or communicate with other fitness or dietary systems. In an example, dietary component 250 may be comprised within a wearable device, such as a smart watch. In such an instance, dietary component 250 may monitor a user's activity (e.g., walking, running, exercise, etc.).

In another aspect, dietary component 250 may receive input (e.g., input 214) from dietary or fitness systems. The input may include exercise information, information about other consumed food or drinks, and the likes. The dietary or fitness systems may be any dietary or fitness system capable of communicating via a wireless or wired connection. Such dietary or fitness system may include a wearable device, a Wi-Fi connected fitness device (e.g., treadmill, gaming counsel, etc.), a gaming device (e.g., a fitness game or program on a gaming device), a computer, laptop, smartphone, tablet or the likes.

In embodiments, dietary component 250 may receive input 214 as user provided input. User input may include information manually entered by a user, such as a user's exercise history, meals, calorie intake, and the likes. Furthermore, user input may include user defined goals or dietary thresholds. Goals may include dietary thresholds or fitness goals. Fitness goals may include, for example, altering weight (e.g., weight loss or weight gain), increasing muscle mass, caloric intakes, and the likes. Dietary thresholds may include levels associated with intake of calories, sodium, fat, vitamins, or the likes.

In another aspect, dietary component 250 may utilize information from various other components to generate suggestions associated with goals and/or thresholds. For instance, dietary component 250 may suggest alterations (e.g., substituting ingredients) in recipes to reduce caloric intake. In another example, dietary component 250 may generate information associated with an amount of exercise needed to burn off or utilize calories from blended ingredients. The suggestion may include a type(s) of exercise based on user's preferences or history. For example, if a user has an affinity to jogging, then dietary component 250 may generate a suggestion indicating an amount of jogging (e.g., distance and/or time) needed to burn off the calories in the blended ingredients.

Moreover, dietary component 250 may communicate with other systems or devices. For instance, dietary component 250 may transmit output 212 to an external system. The output 212 may include dietary goals, blending history, and the likes. In another aspect, output 212 may include data instructing a display device to output a graphical user interface as described in more detail herein.

In at least one embodiment, dietary component 250 and other components of system 200 may receive data as input 214 from one or more server devices or other network devices. The data may comprise update data for updating software, updating dietary information associated with ingredients or potential ingredients, data generated by other users (e.g., user created recipes, friend requests, etc.), or the likes. In some embodiments, dietary component 250 may store, via memory 202, dietary information associated with ingredients or may receive the dietary information from a remote storage device (e.g., a database).

In an aspect, receiving update data may comprise downloading and running a software application. The software application may be capable of connecting to a network, such as the Internet. The software application may be capable of accessing step-by-step recipes or blending programs from a remote database or website, such as www.vitamix.com, and downloading the recipes or programs to the wireless device.

Figure 3:
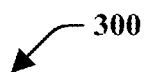
FIG. 3 is a functional block diagram of a blending system including a rating component in accordance with various embodiments described here.

Turning now to FIG. 3, there depicted is a block diagram of a functional blending system 300 that may generate intelligent blending processes based on actual ingredients and user input. Blending system 300 may primarily include contextual blending system 306, memory 302, and processor 304. Memory 302 may store computer executable components such as an ingredient component 310, a measuring component 320, account component 330, a recipe component 340, and a rating component 350. Processor 204 may facilitate operation of the computer executable components.

As above, system 300 may include one or more devices, such as a user device, a blender device(s), and a scale. It is further noted that like named components of various systems described herein may comprise similar or identical aspects and/or functionality unless context suggests otherwise or warrants a particular distinction among such components. For instance, recipe component 140 and recipe component 340 may comprise substantially similar aspects or functionality. Moreover, system 300 may include a different number of components and may include any of the components described herein.

Rating component 350 may receive input 314 as user input regarding a user's affinity to a particular item, such as a recipe, a blended product, an ingredient, or the likes. For example, a user may create a blended drink. After creating the drink, the user may decide whether or not the user likes the drink or the blending process. The user may rate the drink via an interface, such as via a user device, smart phone, a blender, or the likes. The rating may include, for example, an overall rating, a consistency rating, a flavor rating, a preparation time rating, and the likes. Instead of the user, a consumer of the drink may rate the drink via any interface, such as a dedicated computer, tablet or the like in the location or through the consumer's user device, e.g., computer, tablet, smart phone or the like.

In an aspect, the rating may include a number of tokens out of a number of possible tokens (e.g., 3 out of 5 stars, etc.), a thumbs up or thumbs down, a numerical score, or the likes. It is noted that various other rating or ranking systems may be utilized. Such systems may include different nomenclatures, subcategories, or the likes. For instance, a consistency rating may comprise an overall consistency rating and a user's subjective opinion for improvement, such as "too thin," "too thick," "just right," etc. The consistency rating may also indicate the texture of the end product. Alternatively, a separate texture rating may be used. In those embodiments, the texture rating may indicate whether the end product is "too coarse", "not coarse enough," "just right," or any variation thereof.

In an embodiment, rating component 350 may determine what the user does and does not like based on intrinsic or extrinsic data. As such, rating component 350 may utilize user input, statistical data representing a blending history or history of use. For example, as a user rates blended drinks, a pattern may develop. The pattern may indicate a user's preference for or against at least one of ingredient, a combination of ingredients, a blending process, a time associated with blending, temperature, or the likes. For instance, a user may prefer a combination of grapes and apples in a smoothie, but may otherwise be unaware of the preference. Rating component 350 may infer or determine the user's preference for the combination and may notify the user (e.g., such as via a "favorites" or "suggestions" folder) or may automatically suggest using the combination in recipes.

Rating component 350 may publish or share ratings and/or recipes with other users or systems. Publishing may comprise uploading the recipe to a server or other network device that is accessible by other devices connected to the server and/or with appropriate authority. For instance, a user may rate a blended drink and share their rating and their recipe with other users to which the user has a social connection (e.g., friend, acquaintance, etc.). It is noted that sharing of information may be disabled or may be prevent unless a user provides authorization for such sharing. Likewise, personal information may be retained private. This sharing may also include ratings from consumers of the drinks. The consumer ratings may be shared with the restaurant chain and the restaurant chain may modify a recipe based upon this consumer feedback.

Figure 4:
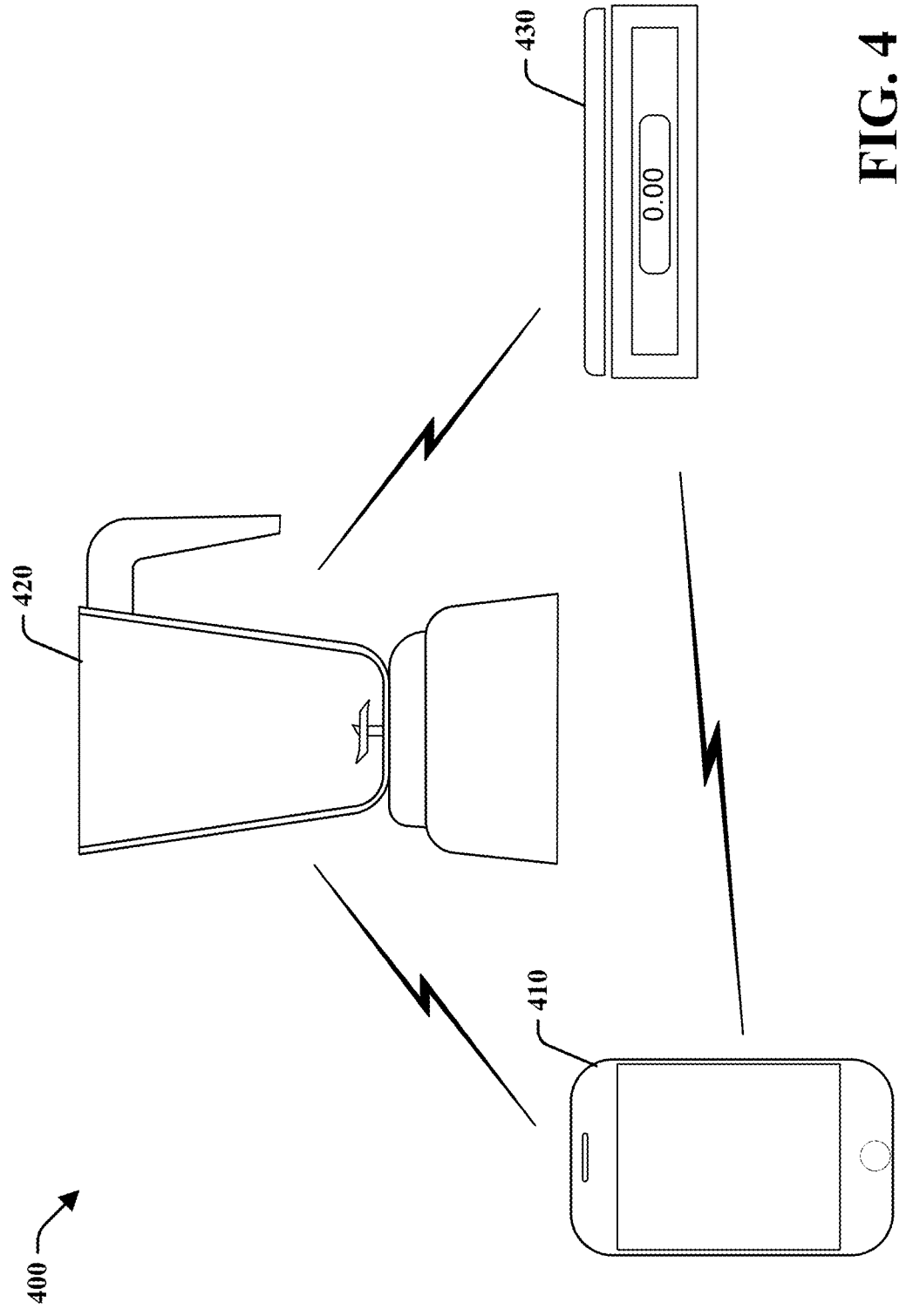
FIG. 4 is an environmental view of a blending system in accordance with various embodiments described here.

FIG. 4 depicts a non-limiting plan diagram of a functional blending system 400 that may provide intelligent blending. As depicted, system 400 may comprise a user device 410, a blender device 420, and a scale device 430. It is noted that some or all devices depicted in FIG. 4 may not be included in various embodiments. As such, FIG. 4 depicts at least one or many envisioned embodiments.

It is noted that system 400 may comprise one or more of various other systems described herein, such as systems 100, 200, and 300. Any one of user device 410, blender device 420 or scale device 430 may comprise all or some of the various components of such systems. By way of illustration, user device 410 may comprise all or part of system 100. Furthermore, user device 410 may comprise all or part of ingredient component 110, account component 130, and recipe component 140, while scale device 430 and/or blender device 420 comprises all or part of measuring component 120. In another example, blender device 420 may comprise all or part of ingredient component 110, measuring component 120, account component 130, and recipe component 140. As such, embodiments described herein are not limited to a certain device(s) or configuration among devices. Further, embodiments describing user device 410, blender device 420 or scale device 430 performing particular acts are understood to be examples.

While shown as distinct devices, the various devices of system 400 may be comprised by one or more device. In an example, blender device 420 may comprise scale device 430. In another example, user device 410 may comprise scale device 430. It is further noted that system 400 may comprise other devices (e.g., access points, server devices, etc.) not shown for sake of brevity.

While user device 410 is depicted as a smart phone, it is noted that user device 410 may comprise one or more other devices. Such devices may include wearable electronics (e.g., smart watches, etc.), laptop computers, desktop computers, tablet computers, gaming devices (e.g., handheld gaming devices, set top boxes, etc.), and the likes. Likewise, blending device 420 and scale device 430 may comprise other configurations or designs. Such devices are not limited to a particular make or model. In an example, blending device 420 and scale device 430 may comprise built in wireless capabilities or may be configured to receive a wireless adapter that enables wireless communication.

User device 410, blender device 420 and scale device 430 may communicate with each other and with other devices (not shown). In an aspect, the devices may communicate via wireless or wired communications. As described above, such devices may utilize near field communication techniques to communicate when the devices are within a determined distance of each other. It is noted that the exact method of communication may vary depending on a desired configuration.

In an example, a user may follow a recipe that may be displayed by user device 410 or the user may create a recipe. When the user desires to add an ingredient, the user may enter a name of the ingredient via an interface of user device 410. In another aspect, the user may use a camera of user device 410 to scan a label or take a picture of the ingredient. User device 410 may identify (e.g., via ingredient component 110, 210, 310, etc.) the ingredient via image recognition or the likes.

The user may also enter status information associated with the ingredient. For instance, the user may provide input to user device 410 about the state of the ingredient, such as cooked, raw, frozen, chopped, etc. The user may also place the ingredient on scale device 430. Scale device 430 may measure a quantity (e.g., weight) of the ingredient. In various embodiments, scale device 430 may communicate a measurement to user device 410. In other embodiments, a user may read an output from scale device 430 and user device 410 may receive user input regarding the output that is read by the user.

In some embodiments, the user may add the ingredient to a blender device 420. In other embodiments, the user may wait to add the ingredient at a later time. It is noted that user device 410 may provide instructions on when to add an ingredient and the user may follow the instructions.

When a user is ready to begin blending (e.g., all initial ingredients are added to the blender), the user may initiate the blending process via an interface. The interface may be comprised by the user device 410, the blending device 420 or the scale device 430. In an aspect, the blending device 420 may follow a customized blending process that is based at least in part on components of a recipe (e.g., ingredients, status of ingredients, quantity, etc.) and user preferences.

It is noted that user device 410 may provide output or notifications to a user during the blending, preparation, and/or creation of a recipe. For instance, user device 410 may provide a notification as an audible and/or visual queue to a user. The notification may include a popup or fly out that provides a suggestion for altering a recipe to achieve a user's preference (e.g., "To reach your preferred consistency or texture, try adding 1 more cup of liquid ingredients," etc.). In at least one embodiment, the notification may include computer generated voice output, audio-video output, or the likes.

In another aspect, user device 410 may provide notifications regarding error or fault checking. The error checking may be related to malfunctions or misconfigurations of devices (e.g., lid not engaged on blender device 420), forgotten ingredients, wrong ingredients, potential allergens, or the likes.

Figure 5:
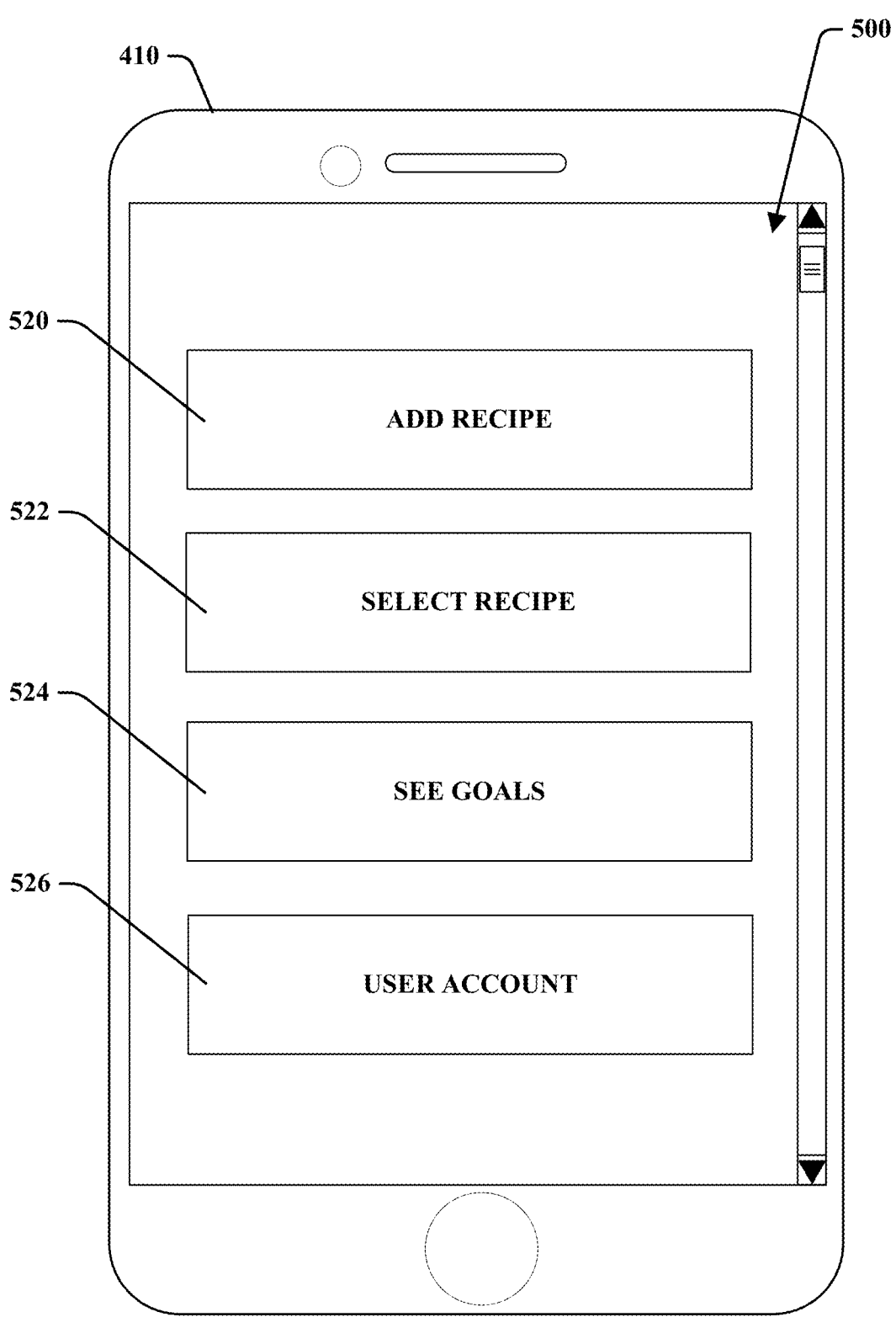
FIG. 5 is a diagram of an exemplary interface of a blending system in accordance with various embodiments described here.
Figure 6:
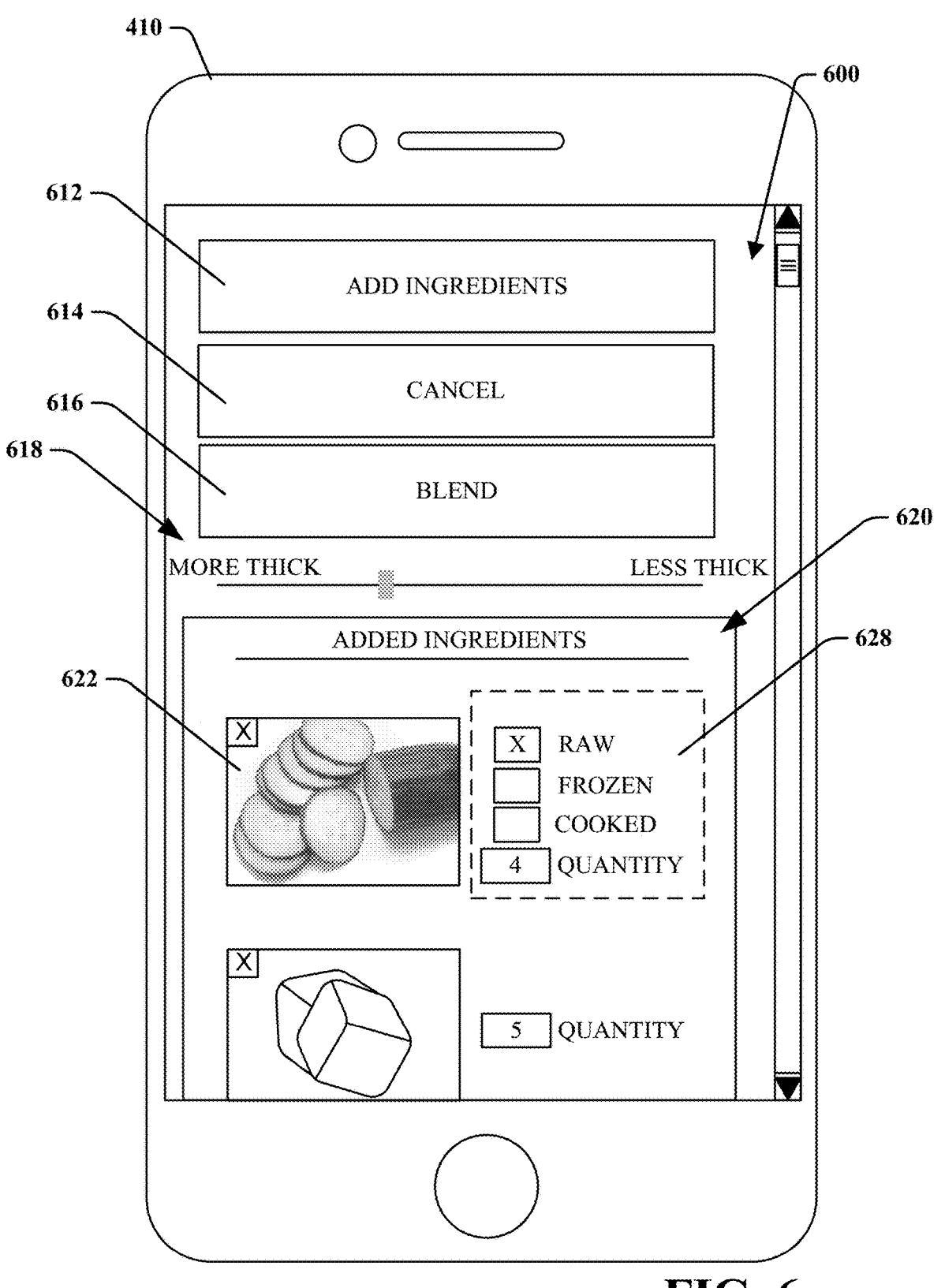
FIG. 6 is a diagram of another exemplary interface of a blending system in accordance with various embodiments described here.

FIGS. 5 and 6 are non-limiting user interfaces 500 and 600, respectively. While depicted as interfaces of user device 410, it is noted that interfaces 500 and 600 may be interfaces of other devices (e.g., blender device 420, etc.). In embodiments, interface 500 and 600 may be rendered by a user interface device, such as a monitor of touch screen. In an aspect, a blending system (e.g., system 100, 200, etc.) may instruct the user interface device to render the interfaces 500 or 600. It is noted that actions described with reference to interfaces 500 or 600 may be accomplished via one or more other systems described herein (e.g., system 100, 200, etc.). Furthermore, while embodiments may reference user actions, it is noted that users (e.g., humans, etc.) may not be required to perform such actions.

Different interfaces may be utilized to enable additional or different functionality. Such interfaces may also provide different means of organizing navigation, selection and the likes. The interfaces presented herein are intended to provide examples of possible interfaces and are not intended to limit the scope of various other embodiments.

Referring first to FIG. 5, interface 500 depicts a rendering of output associated with a blending system. The rendering may comprise one or more buttons or selection tokens. Selection of such tokens may initiate other actions, such as rendering different screens and the likes. As depicted, interface 500 may include an add recipe token 520, a select recipe token 522, a see goals token 524, and a user account token 526. Each token may be selectable and may represent a certain set of actions or responses to selection.

Add recipe token 520 may be associated with actions related to adding a new recipe, such as a user created recipe or a downloadable recipe. In an aspect, in response to receiving user input regarding selection of the recipe, user device 410 may receive (e.g., via ingredient component 310, etc.) additional input regarding ingredients. Further, select recipe token 522 may be associated with actions related to selecting an existing recipe, such as a recipe stored in a memory (e.g., memory 302, etc.).

See goals token 524 may be associated with fitness or dietary goals. In response to receiving input that represents a selection of see goals token 524, user device 410 may generate a rendering of user goals. User goals may be generated (e.g., via dietary component 250) over a period of time and/or with respect to future needs. Moreover, usage reports and dietary/fitness progress may be presented to a user via a graph, chart, or the likes.

User account token 526 may be associated with maintaining, adding, or editing information associated with one or more users. For instance, a user may select the user account token 526 to add a new blending device, link devices, set preferences, and the likes. In an aspect, functionality associated with user account token 526 may be enabled via account component 230.

Interface 600 is an example rendering for creating a custom recipe and blending process. For instance, a user may add various ingredients and statuses of ingredients via interface 600 (e.g., through an ingredient component 110, 210, etc.). Likewise, a user may initiate generation of a blending process and/or execution of a blending process (e.g., by blending device 420).

In an embodiment, interface 600 may include a set of control tokens comprising add ingredients token 612, cancel token 614 (which may cancel a current project), a blend token 616, and a consistency control token 618. Furthermore, interface 600 may include an added ingredients area or element 620. Added ingredients area 620 may comprise (if available) an image 622 or identity of an added ingredient and status tokens 628.

As an example, a user may interact with interface 600 to create a custom recipe. The user may select add ingredients token 612 to add an ingredient to a list of added ingredients. The list off added ingredients may be presented in an added ingredients area 620. As described herein, the user may provide input such as text or voice input regarding an identity of an ingredient. In another example, the user may utilize user device 410 to capture an image of an ingredient, scan a label or identifier associated with an ingredient, collect a headspace sample of an ingredient, or the likes. User device 410 may identify (e.g., via ingredient component 110, 210, 310, etc.) an ingredient based on received information.

Once an ingredient is added, the user may be prompted to configure a status of the ingredient via status tokens 628. The prompt may be an audible, visual, or tactile (e.g., vibration, etc.) prompt. As described in more detail above, the status of the ingredient may include various fields and may be dependent on the identity of the ingredient. In this example, the ingredient is "sliced cucumber" and the user has select "raw" with a quantity of four. It is noted that the quantity may be a number of items (e.g., four cucumbers), a weight (e.g., 4 ounces) as provided via a measurement component (e.g., measurement component 120, 220, 320, etc.), a volume (e.g., 4 cups), generalized measurements (e.g., one pinch, a handful, etc.), or the likes.

In embodiments, the user may also select a desired consistency via consistency token 618. While depicted as a slideable scale, consistency token 618 may take various forms, such as a numerical value, a rating scale, or the likes. It is noted that consistency token 618 may be preset based on user preferences. It is further noted that consistency token 618 may be constrained (e.g., via upper or lower bounds) based on added ingredients and a make and model of a blending device. For instance, a recipe component (e.g., recipe component 140, 240, 340, etc.) may determine a maximum or minimum level of thickness given the added ingredients and/or the blending devices being utilized. Such maximum and minimum levels may constrain selectable regions of consistency token 618. In some embodiments, the consistency token 618 may account for the texture of the end product. In other embodiments, a separate texture token (not shown) may be utilized. The texture token may take various forms, such as a numerical value, a rating scale, or the likes. It is noted that texture token may be preset based on user preferences. It is further noted that texture 618 may be constrained (e.g., via upper or lower bounds) based on added ingredients and a make and model of a blending device.

As a user adds ingredient, device 410 may render prompts to provide information or notify the user. The prompts may be popups, fly outs, or other visual prompts. For example, given a user's preference for a particular consistency or texture, device 410 may determine (e.g., via a recipe component 140, 240, 340, etc.) what ingredients may be altered (e.g., added, removed, etc.) to achieve the user's desired consistency or texture. Device 410 may generate a popup window to list the suggestions. The popup window may be displayed in response to a user action (e.g., selection of a "suggestions token"—not shown). In another example, a prompt may indicate a dietary/fitness attribute such as exceeding a target calorie count for a recipe, an amount of exercise required to burn off the calories, or the likes.

In response to selection of blend token 616 (or another triggering event), device 410 may initiate generation (e.g., via a recipe component 140, 240, 340, etc.) of a custom blending process based at least in part on contextual information associated with ingredients or a blending device. Once a customized (e.g., optimized based on user preferences) blending process is created, a user may review the blending process and aspects associated with the blending process, such as estimate time, estimated temperature, and the likes.

In view of the subject matter described herein, methods that may be related to various embodiments may be better appreciated with reference to the flowcharts of FIGS. 7-10. While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 7 depicts an exemplary flowchart of non-limiting method 700 associated with a blending systems, according to various aspects of the subject disclosure. As an example, method 700 may determine a blending process based on contents of a blending device and blending preferences. Further, method 700 may facilitate implementation of the blending process by the blending device.

At 702, identifying, by a system (e.g., via ingredient component 110), an ingredient associated with a set of ingredients to be blended. Identifying the ingredient may include determining an identity of the ingredient based on received data. Received data may include user input (e.g., text input, voice input, selections from drop down menus, etc.), image input, scent input, or the likes. It is noted that a list of library of identities may be stored in a database or memory store, which may be remote or local storage. Stored identities or related information may be matched in received data to determine the identity of the ingredient.

At 704, analyzing, by the system (e.g., via recipe component 140), the set of ingredients and data describing a blending preference. The blending preferences may include user defined preferences (e.g., consistency preferences, blend time preferences, power consumption preferences, etc.), predetermined preferences, or the likes as described herein. In an aspect, analyzing the set of ingredients and data describing the blending preference may include utilizing a program or process that balances (e.g., optimizes) one or more aspects of a blending process. In some embodiments, analyzing may include determining ratios (e.g., liquid to solid ratios, ratios associated with temperature, or the likes).

At 706, determining, by the system (e.g., via recipe component 140), parameters for operation of a blending device based at least in part on the analysis of the set of ingredients and the data. It is noted that a system may utilize various algorithms or processes to determine the operating parameters, as described herein. For instance, determining the parameters may comprise a statistical model that achieves a desired result based on selecting various parameters in light of ingredients and blending preferences. Further still, the system may determine or modify parameters of the blending device based on input from the system, e.g., input from a user device, the blending device, a container, a separate input device, a sensor or the like. As described herein, the parameters may include timing information, motor power parameters, motor speeds, ramp up periods, or the like.

At 708, transmitting, by the system (e.g., via recipe component 140), data instructing the blending device to blend the set of ingredients based at least in part on the parameters. For example, a user device may send a generated blending process (e.g., operating parameters) to a blender device. In another example, a processor of a blending device may transmit instructions to various controllers or components (e.g., motor, ASICs, etc.).

FIG. 8 depicts an exemplary flowchart of non-limiting method 800 associated with a blending systems that may generate a notification, according to various aspects of the subject disclosure. As an example, method 800 may generated a suggestion for altering contents of a blender and generate a notification of the suggestion.

At 802, monitoring, by a system (e.g., via recipe component 240 and/or dietary component 250), a history associated with a user entity, wherein the history comprises data describe at least one of a blending history, a dietary history, or a fitness activity history. In embodiments, the history may comprise data describing previous blending instances associated with the user entity, exercising activity associated with the user entity and the likes.

At 804, determining, by the system (e.g., via recipe component 240), data describing a user preference. Determining the data describing the user preferences may include retrieving the data from a memory store, determining the data based on an analysis of historical data, or the likes. As such, the user preferences may be explicitly defined by the user entity or may be derived based on a history associated with the user entity.

At 806, generating, by the system (e.g., via recipe component 240), a suggestion for altering a set of ingredients based on at least one of the data describing a blending preference, the history, or a user defined threshold associated with a blended product. The suggestion may include adding an ingredient, altering a state/status of an ingredient, altering rations, or the likes. For instance, the system may determine the ratio of solids to liquids that may result in a blended product that has a consistency that the user may not prefer, such as the blended product will result in a thin drink. In such an instance, the system may generate a suggestion that the user add a thickening agent or more solid ingredients to a blender device. Still further, the system may instruct the blending device to blend at a lower speed or for a shorter duration than otherwise.

At 808, generating, by the system (e.g., via recipe component 240), a notification that conveys the suggestion. The notification may be a popup, fly out, banner message, or the likes. For instance, an interface of a smart phone or blending device may display the notification. In another example, the notification may be an audio or audio-visual queue.

Figure 9:
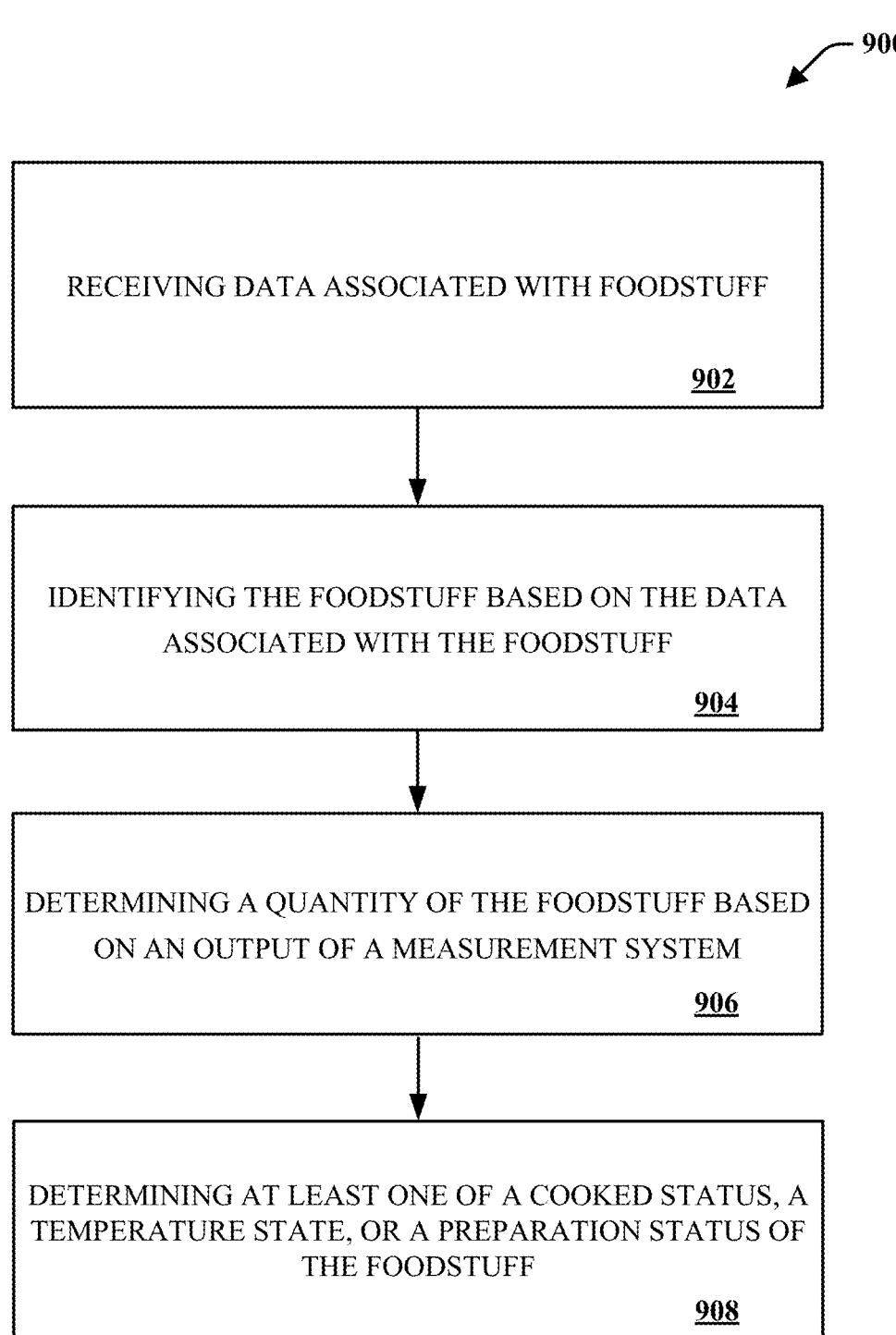
FIG. 9 is a flow diagram of an exemplary method associated with a blender system that may identify an ingredient and properties of the ingredient in accordance with various embodiments described here.

FIG. 9 depicts an exemplary flowchart of non-limiting method 900 associated with a blending systems that may identify an ingredient and properties of the ingredient, according to various aspects of the subject disclosure. As an example, method 900 may determine identities of ingredients or foodstuffs, quantities, and other aspects related to a state or status of the foodstuffs.

At 902, receiving, by a system (e.g., via identity component 310), data associated with foodstuff. The data associated with the foodstuff may include image data (including, without limitation, visual light range and non-visual light range), user input (e.g., text data, selection data, voice input, etc.), scent data (e.g., chemical input), or the likes. In an example, the user may utilize a camera to capture an image of an ingredient.

At 904, identifying, by the system (e.g., via identity component 310), an identity of the foodstuff based on the data associated with the foodstuff. The identity may include a name or unique identifier associated. For instance, the user may capture an image of the ingredient and the system may perform image recognition techniques to determine an identity of the ingredient.

At 906, determining, by the system (e.g., via identity component 310), a quantity of the foodstuff based on an output of a measurement system (e.g., measurement component 320). The measurement system may include a scale or other device. In various embodiments, the output may be communicated via a communication framework, via user input, or the likes.

At 908, receiving, by the system (e.g., via ingredient component 310), at least one of a cooked status, a temperature state, or a preparation status of the foodstuff. A cooked status may include information that describes whether foodstuff is cooked, raw, or the likes. In another aspect, a cooked status may include a degree or type of cooking (e.g., seared, boiled, fried, etc.). A temperature state may include parameters such as frozen, thawed-previously frozen, cooked-warm, cooked-cooled, or the likes. Further, a temperature state may include a measured or otherwise determine temperature such as through the container as described above. Such temperatures may be a scaled or estimate of temperature (e.g., hot, warm, cold, etc.), actual temperature (e.g., Fahrenheit, Celsius, etc.), or other measurement techniques. Preparation status of the foodstuff may refer to whether the foodstuff is peeled, cut, chopped, sliced, etc. In an aspect, preparation statuses may be unique to one or more types of ingredients. For example, ice may have a crushed preparation status but may not have a peeled status.

Figure 10:
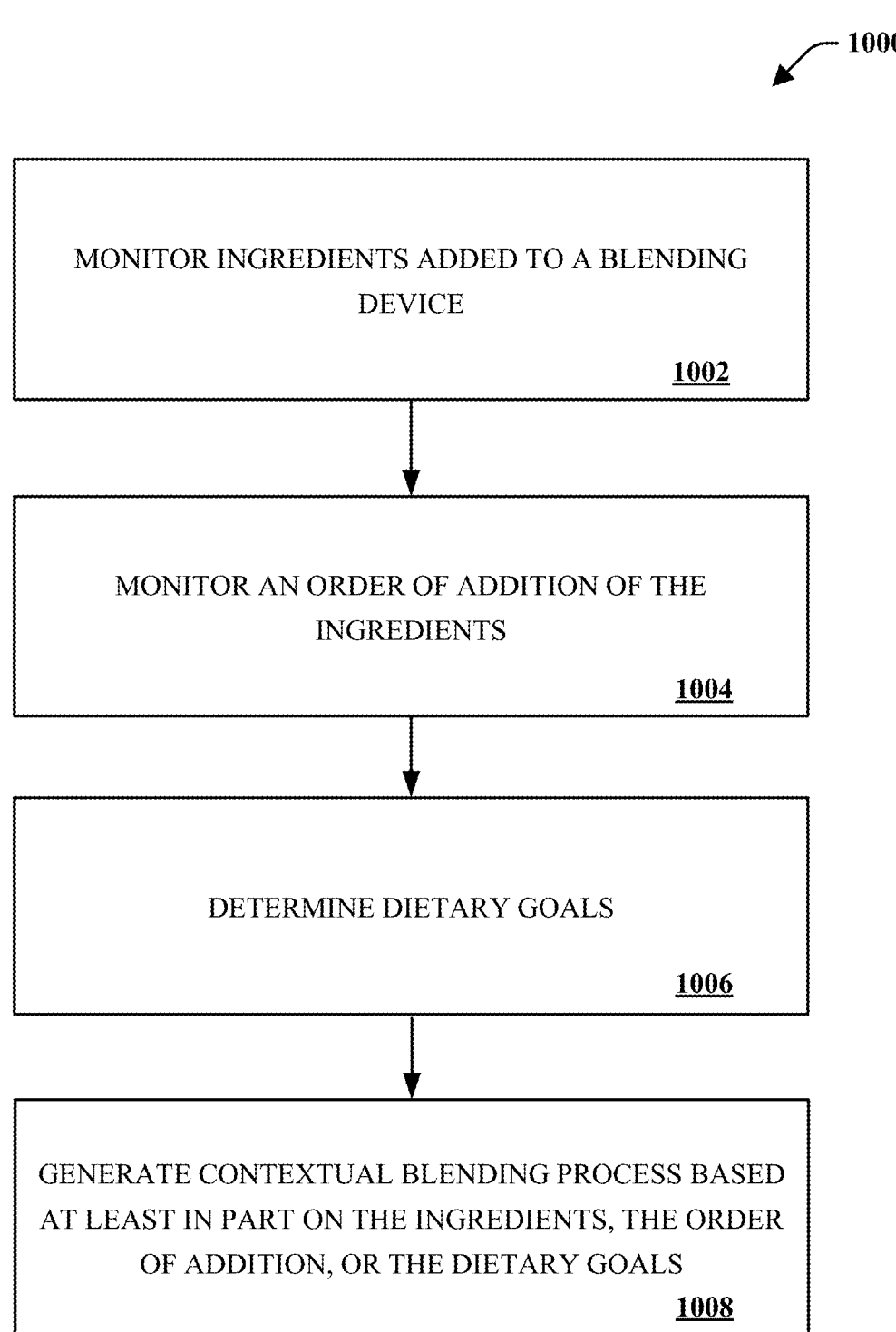
FIG. 10 is a flow diagram of an exemplary method associated with a blender system that may generate a contextual blending process in accordance with various embodiments described here.

FIG. 10 depicts an exemplary flowchart of non-limiting method 1000 associated with a blending systems that may generate a contextual blending process, according to various aspects of the subject disclosure. As an example, method 1000 may monitor ingredients added to a blending device and may create customized blending processes based on the monitoring.

At 1002, monitor, by a system (e.g., via user device 410), ingredients added to a blending device. Monitoring the ingredients may include monitoring the ingredients as they are added to a blending device, monitoring ingredients as a user provides input regarding the addition of the ingredients, or the likes. In an aspect, monitoring may include storing data (e.g. in a memory device).

At 1004, monitor, by the system (e.g., via user device 410), an order of addition of the ingredients. In embodiments, the system may monitor ingredients as they are added and/or as a user indicates that the ingredients are added. In some embodiments, a user may alter or override orders of addition. For example, a user may measure ingredients and provide user input regarding the ingredients. The user may put ingredients aside while measuring other ingredients. The user may, at a later time, add the ingredients to a blending device. In this example, the user may realize that they added ingredients in a different order. As such, the user may alter the order in a blending system (e.g., blending system 100, etc.).

At 1006, determine, by the system (e.g., via user device 410), dietary goals.

Dietary goals may be determined based on stored information, user input, information received from other systems (e.g., an application on a smart phone or other smart device) or the likes.

At 1008, generate, by the system (e.g., via user device 410), intelligent blending process based at least in part on the ingredients, the order of ingredients, and dietary goals. As described herein, the intelligent blending process may include an instruction or set of instructions for operation of a blender device.

Figure 11:
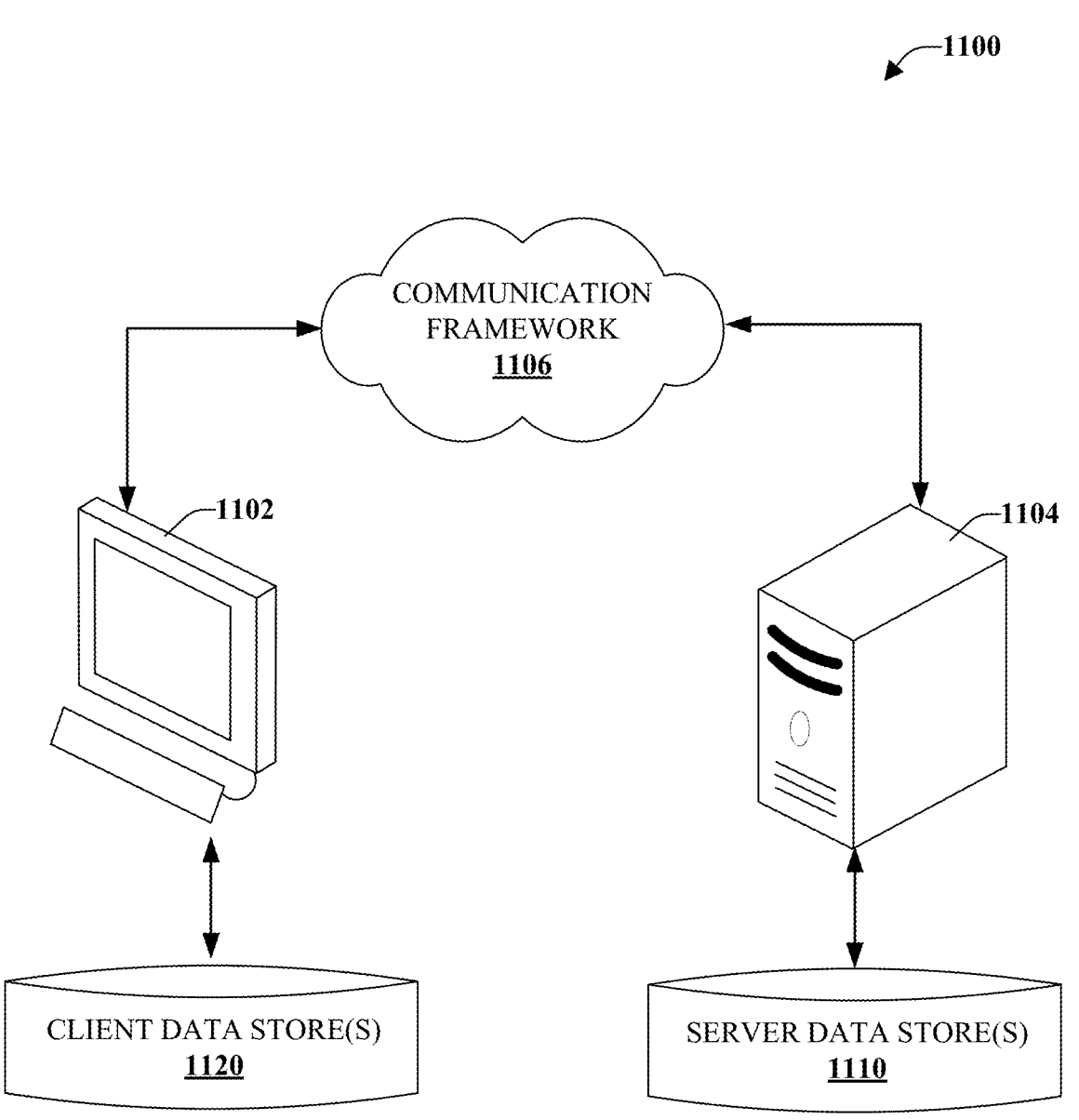
FIG. 11 is an environmental diagram of an exemplary communication system in accordance with various embodiments disclosed herein.
Figure 12:
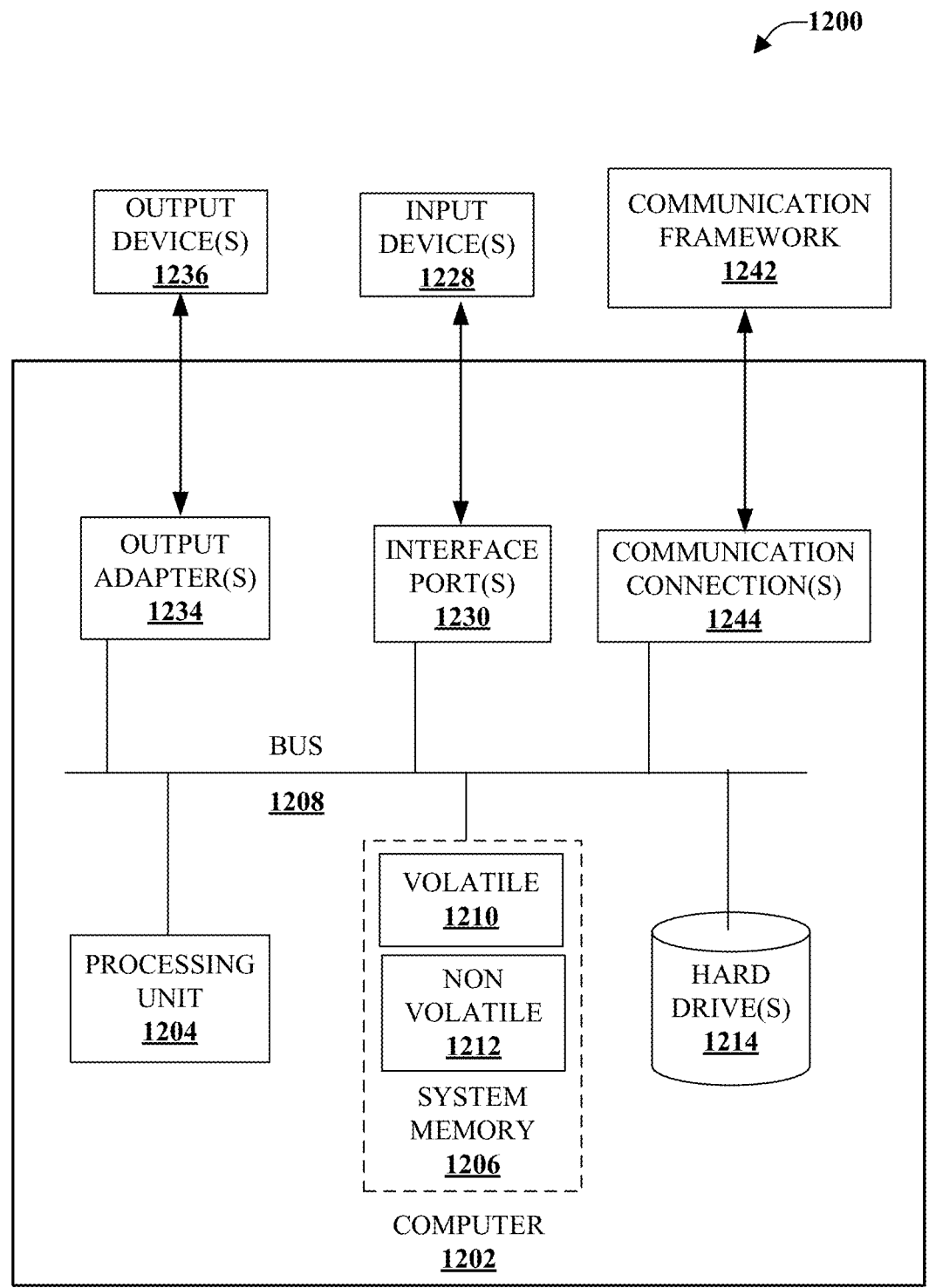
FIG. 12 is a block diagram of a functional computer system in accordance with various embodiments described here.

What has been described above may be further understood with reference to the following figures. FIGS. 11 and 12 provide exemplary operating environments or systems capable of implementing one or more systems, apparatuses, or processes described above. FIGS. 11 and 12 are not intended to limit the scope of such systems, apparatuses, or processes. By way of example, computing environment 1100 may refer to one or more embodiment of the various embodiments described with reference to the above figures. However, variations to computing environment 1100 may be obvious to achieve aspects or processes described herein.

FIG. 11 is a schematic diagram of a computing environment 1100 in accordance with various disclosed aspects. It is noted that environment 1100 may include various other components or aspects. As depicted, system 1100 may include one or more client(s) 1102, one or more server(s) 1104, one or more client data store(s) 1120, one or more server data store(s) 1110, and a communication framework 1106.

While depicted as a desktop computer(s), client(s) 1102 may include various other devices that may comprise hardware and/or software (e.g., program threads, processes, computer processors, non-transitory memory devices, etc.). In an example, client(s) 1102 may include laptop computers, smart phones, tablet computers, blender devices, wearables, etc.). The client(s) 1102 may include or employ various aspects disclosed herein. For example, client(s) 1102 may include or employ all or part of various systems (100, 200, 300, etc.) and processes (e.g., method 700, 800, 900, etc.) disclosed herein.

Likewise, server(s) 1104 may include various devices that may comprise hardware and/or software (e.g., program threads, processes, computer processors, non-transitory memory devices, etc.). Server(s) 1104 may include or employ various aspects disclosed herein. For example, server(s) 1104 may include or employ all or part of various systems (100, 200, 300, etc.) and processes (e.g., method 700, 800, 900, etc.) disclosed herein. It is noted that server(s) 1104 and client(s) 1102 may communicate via communication framework 1106. In an exemplary communication, client(s) 1102 and server(s) 1104 may utilize packeted data (e.g., data packets) adapted to be transmitted between two or more computers. For instance, data packets may include coded information associated with blending processes, dietary information of ingredients, or the likes.

Communication framework 1106 may comprise various network devices (e.g., access points, routers, base stations, etc.) that may facilitate communication between client(s) 1102 and server(s) 1104. It is noted various forms of communications may be utilized, such as wired (e.g., optical fiber, twisted copper wire, etc.) and/or wireless (e.g., cellular, Wi-Fi, near field communication, etc.) communications.

In various embodiments, client(s) 1102 and server(s) 1104 may respectively include or communicate with one or more client data store(s) 1120 or one or more server data store(s) 1110. The data stores may store data local to client(s) 1102 or server(s) 1104.

In at least one embodiment, a client of client(s) 1102 may transfer data describing a recipe, user account data, ratings, or the likes to a server of server(s) 1104. The server may store the data and/or employ processes to alter the data. For example, the server may transmit the data to other clients of client(s) 1102.

FIG. 12 is a block diagram of a computer system 1200 that may be employed to execute various disclosed embodiments. Its is noted that various components may be implement in combination with computer executable instructions, hardware devices, and/or combinations of hardware and software devices that may be performed by computer system 1200.

Computer system 1200 may include various components, hardware devices, software, software in execution, and the likes. In embodiments, computer system 1200 may include computer 1200. Computer 1200 may include a system bus 1208 that couples various system components. Such components may include a processing unit(s) 1204, system memory device(s) 1206, disk storage device(s) 1214, sensor(s) 1235, output adapter(s) 1234, interface port(s) 1230, and communication connection(s) 1244. One or more of the various components may be employed to perform aspects or embodiments disclosed herein. In an aspect, the computer system 1200 may "learn," such as described above user preferences based upon modifications of recipes by users, through rating of recipes both positively and negatively. For example, the computer system 1200 may modify a particular recipe (or a set thereof) as the majority of users or supermajority thereof have disapproved of the recipe (such as for taste, texture, consistency, temperature, or a variety of these factors). The computer system 1200 may dynamically push out the revised recipe or receive the revised recipe as applicable.

Processing unit(s) 1204 may comprise various hardware processing devices, such as single core or multi-core processing devices. Moreover, processing unit(s) 1204 may refer to a "processor," "controller," "computing processing unit (CPU)," or the likes. Such terms generally relate to a hardware device. Additionally, processing unit(s) 1204 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the likes.

System memory 1206 may include one or more types of memory, such volatile memory 1210 (e.g., random access memory (RAM)) and non-volatile memory 1212 (e.g., read-only memory (ROM)). ROM may include erasable programmable ROM (EPROM), electrically erasable programmable ROM (EEPROM). In various embodiments, processing unit(s) 1204 may execute computer executable instructions stored in system memory 1206, such as operating system instructions and the likes.

Computer 1202 may also one or more hard drive(s) 1214 (e.g., EIDE, SATA). While hard drive(s) 1214 are depicted as internal to computer 1202, it is noted that hard drive(s) 1214 may be external and/or coupled to computer 1202 via remote connections. Moreover, input port(s) 1230 may include interfaces for coupling to input device(s) 1228, such as disk drives. Disk drives may include components configured to receive, read and/or write to various types of memory devices, such as magnetic disks, optical disks (e.g., compact disks and/or other optical media), flash memory, zip drives, magnetic tapes, and the likes.

It is noted that hard drive(s) 1214 and/or other disk drives (or non-transitory memory devices in general) may store data and/or computer-executable instructions according to various described embodiments. Such memory devices may also include computer-executable instructions associated with various other programs or modules. For instance, hard drives(s) 1214 may include operating system modules, application program modules, and the likes. Moreover, aspects disclosed herein are not limited to a particular operating system, such as a commercially available operating system.

Input device(s) 1228 may also include various user interface devices or other input devices, such as sensors (e.g., microphones, pressure sensors, light sensors, etc.), scales, cameras, scanners, facsimile machines, and the likes. A user interface device may generate instructions associated with user commands. Such instructions may be received by computer 1202. Examples of such interface devices include a keyboard, mouse (e.g., pointing device), joystick, remote controller, gaming controller, touch screen, stylus, and the likes. Input port(s) 1230 may provide connections for the input device(s) 1228, such as via universal serial ports USB ports), infrared (IR) sensors, serial ports, parallel ports, wireless connections, specialized ports, and the likes.

Output adapter(s) 1234 may include various devices and/or programs that interface with output device(s) 1236. Such output device(s) 1236 may include LEDs, computer monitors, touch screens, televisions, projectors, audio devices, printing devices, or the likes.

In embodiments, computer 1202 may be utilized as a client and/or a server device. As such, computer 1202 may include communication connection(s) 1244 for connecting to a communication framework 1242). Communication connection(s) 1244 may include devices or components capable of connecting to a network. For instance, communication connection(s) 1244 may include cellular antennas, wireless antennas, wired connections, and the likes. Such communication connection(s) 1244 may connect to networks via communication framework 1242. The networks may include wide area networks, local area networks, facility or enterprise wide networks (e.g., intranet), global networks (e.g., Internet), satellite networks, and the likes. Some examples of wireless networks include Wi-Fi, Wi-Fi direct, BLUETOOTH™, Zigbee, and other 802.XX wireless technologies. It is noted that communication framework 1242 may include multiple networks connected together. For instance, a Wi-Fi network may be connected to a wired Ethernet network.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the likes. In another aspect, such terms may include both an application running on a processor and a processor. Moreover, such terms may be localized to one computer and/or may be distributed across multiple computers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define the blending system 100. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A blender system comprising:
a memory to store instructions; and
a processor, communicatively coupled to the memory configured to facilitate execution of the instructions to perform operations, comprising:

determining an identity of an ingredient being added to a set of ingredients for blending;

generating a blending process from a stored blending process stored in the memory based at least in part on the set of ingredients, the blending process including an operating parameter associated with a motor of the blender system; and recommending a new ingredient to be added to the set of ingredients.

2. The blender system of claim 1, wherein generating the blending process further comprises:

generating the blending process based at least in part on user preference information, stored on the memory, associated with the blending.

3. The blender system of claim 1, wherein the blender system further comprises a sensor, and the set of ingredients is identified by the sensor.

4. The blender system of claim 1, wherein generating the blending process further comprises:

generating the blending process based at least in part on a target consistency, stored on the memory, describing a desired thickness of a mixture resulting from blending of the set of ingredients.

5. The blender system of claim 1, wherein the operations further comprise:

receiving data, from the memory, describing a property of the ingredient.

6. The blender system of claim 5, wherein receiving the data describing the property of the ingredient further comprises:

receiving the data, from the memory, as at least one of a cooked status, a temperature state, or a preparation status of the ingredient.

7. The blender system of claim 5, wherein receiving the data describing the property of the ingredient further comprises:

receiving the data, from the memory, as a quantity of the ingredient.

8. The blender system of claim 7, wherein the operations further comprise:

determining the quantity of the ingredient.

9. The blender system of claim 1, wherein the operations further comprise:

receiving data describing a user preference associated with at least one of a consistency of a blend, a blend time, dietary thresholds, or a flavor profile.

10. The blender system of claim 1, further comprising at least one of a tablet, smartphone, wearable device, networked computer system, central computer system, laptop, or desktop.

11. The blender system of claim 1, wherein generating the blending process further comprises:

generating the blending process based at least in part on a target texture, stored on the memory, describing a desired coarseness of a mixture resulting from the blending of the set of ingredients.

12. The blender system of claim 1, wherein generating the blending process further comprises:

selecting a motor speed associated with the motor of the blender system based at least in part on a characteristic of the set of ingredients.

13. The blender system of claim 1, wherein generating the blending process further comprises:

selecting a time interval for a particular motor speed associated with the motor of the blender system based at least in part on a characteristic of the set of ingredients.

14. The blender system of claim 1, wherein the new ingredient is recommended to achieve a target consistency, stored on the memory, describing a desired thickness of a mixture resulting from blending of the set of ingredients.

* * * * *